US010696880B2

(12) United States Patent
Yoshie et al.

(10) Patent No.: US 10,696,880 B2
(45) Date of Patent: Jun. 30, 2020

(54) POLYESTER ADHESIVE COMPOSITION AND ADHESIVE SHEET

(71) Applicant: NITTO DENKO CORPORATION, Ibaraki-shi, Osaka (JP)

(72) Inventors: Satomi Yoshie, Ibaraki (JP); Shigeki Ishiguro, Ibaraki (JP); Akiko Tanaka, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/300,966

(22) PCT Filed: Jan. 16, 2015

(86) PCT No.: PCT/JP2015/051074
§ 371 (c)(1),
(2) Date: Sep. 30, 2016

(87) PCT Pub. No.: WO2015/151551
PCT Pub. Date: Oct. 8, 2015

(65) Prior Publication Data
US 2017/0029675 A1 Feb. 2, 2017

(30) Foreign Application Priority Data

Apr. 3, 2014 (JP) .................................. 2014-077022

(51) Int. Cl.
| | |
|---|---|
| C09J 175/06 | (2006.01) |
| C08G 18/36 | (2006.01) |
| C08G 18/79 | (2006.01) |
| C08G 18/42 | (2006.01) |
| C09J 167/02 | (2006.01) |
| C08G 18/80 | (2006.01) |
| C09J 7/38 | (2018.01) |
| C08J 7/04 | (2020.01) |
| C08G 18/66 | (2006.01) |
| C08G 63/16 | (2006.01) |

(52) U.S. Cl.
CPC ............ *C09J 175/06* (2013.01); *C08G 18/36* (2013.01); *C08G 18/4233* (2013.01); *C08G 18/4252* (2013.01); *C08G 18/6662* (2013.01); *C08G 18/792* (2013.01); *C08G 18/8009* (2013.01); *C08G 63/16* (2013.01); *C08J 7/0427* (2020.01); *C09J 7/38* (2018.01); *C09J 167/02* (2013.01); *C08G 2170/40* (2013.01); *C08J 2375/06* (2013.01); *C09J 2201/618* (2013.01); *C09J 2203/318* (2013.01); *C09J 2467/00* (2013.01); *C09J 2467/006* (2013.01)

(58) Field of Classification Search
None
See application file for complete search history.

(56) References Cited

U.S. PATENT DOCUMENTS

| | | | |
|---|---|---|---|
| 2004/0191509 A1* | 9/2004 | Kishioka | B32B 7/10 428/354 |
| 2011/0091716 A1* | 4/2011 | Yoshie | C08G 18/4288 428/317.3 |
| 2011/0135924 A1* | 6/2011 | Takahira | C08G 18/4202 428/355 R |
| 2012/0202058 A1* | 8/2012 | Takahira | C08G 18/4202 428/355 EN |
| 2012/0232226 A1* | 9/2012 | Takahira | C09J 167/08 525/451 |
| 2015/0050493 A1 | 2/2015 | Yoshie | |
| 2015/0056446 A1 | 2/2015 | Ishiguro et al. | |

FOREIGN PATENT DOCUMENTS

| | | | |
|---|---|---|---|
| CN | 102906155 A | 1/2013 | |
| EP | 2703422 | 3/2014 | |
| JP | H08-157798 A * | 6/1996 | ............ C09J 167/02 |
| JP | 2006/206727 | 8/2006 | |
| JP | 2007/327012 | 12/2007 | |
| JP | 2010/209324 | 9/2010 | |

(Continued)

OTHER PUBLICATIONS

National Center for Biotechnology Information. PubChem Compound Database; CID=8042, https://pubchem.ncbi.nlm.nih.gov/compound/8042. Created Mar. 26, 2005. Accessed Mar. 29, 2017.*
Machine translation of WO 2012/086554 A1 (Year: 2012).*
Machine translation of JPH08-157798A. (Year: 1996).*
International Preliminary Report on Patentability, dated Oct. 13, 2016, in International Patent Application No. PTC/JP2015/051074.
Taiwanese Office Action, dated Jun. 25, 2018, in corresponding to Taiwanese Patent Application No. 104101884.
Office Action, dated Jun. 18, 2018, in corresponding Japanese Patent Application No. 2014-077022.

(Continued)

*Primary Examiner* — Elizabeth A Robinson
*Assistant Examiner* — Thomas A Mangohig
(74) *Attorney, Agent, or Firm* — Knobbe Martens Olson & Bear, LLP

(57) ABSTRACT

Provided are a polyester-based pressure-sensitive adhesive composition having high wetting ability and superior adherability and light peelability, and a pressure-sensitive adhesive sheet produced with such a pressure-sensitive adhesive composition. The polyester-based pressure-sensitive adhesive composition includes a polyester obtained by polycondensation of a difunctional or polyfunctional carboxylic acid and a diol; a fatty acid ester; and a crosslinking agent, wherein the polyester has a weight average molecular weight of 8,500 to 50,000, and the fatty acid ester has no additional functional group and has a molecular weight of 200 to 700. The polyester-based pressure-sensitive adhesive composition contains 10 to 150 parts by weight of the fatty acid ester based on 100 parts by weight of the polyester.

4 Claims, No Drawings

(56) References Cited

FOREIGN PATENT DOCUMENTS

| | | |
|---|---|---|
| JP | 2010/248489 | 11/2010 |
| JP | 2011/190420 | 9/2011 |
| JP | 2013/159762 | 8/2013 |
| JP | 2013 216875 | 10/2013 |
| JP | 2014 111701 | 6/2014 |
| WO | WO 2011/136906 | 11/2011 |
| WO | WO 2012/086554 A1 * | 6/2012 ............ C09J 183/04 |
| WO | WO 2013/012037 | 1/2013 |
| WO | WO 2013/137109 | 9/2013 |

OTHER PUBLICATIONS

Office Action, dated Jan. 18, 2019, in corresponding Chinese Patent Application No. 201580018853.0.
Chinese Office Action, dated May 13, 2019, in corresponding Chinese Patent Application No. 201580018853.0.
The Third Chinese Office Action, dated Aug. 16, 2019, in corresponding Chinese Patent Application No. 201580018853.0.
Chinese Decision of Rejection, dated Dec. 31, 2019, in corresponding Chinese Patent Application No. 201580018853.0.

\* cited by examiner

POLYESTER ADHESIVE COMPOSITION AND ADHESIVE SHEET

TECHNICAL FIELD

The invention relates to a polyester-based pressure-sensitive adhesive composition and a pressure-sensitive adhesive sheet produced with the pressure-sensitive adhesive composition.

BACKGROUND ART

With current widespread use of large-screen terminals such as mobile terminals, touch panel-type mobile terminals, and tablet terminals, pressure-sensitive adhesive sheets for protecting the surface of large screens (surface protective sheets) have come to be used. However, there is a problem in that air bubbles can be trapped by a pressure-sensitive adhesive sheet being attached to the surface of a large screen, and the pressure-sensitive adhesive (layer) of the pressure-sensitive adhesive sheet is required to have high wetting ability on the adherend.

When no longer needed, the attached pressure-sensitive adhesive sheet will be peeled off and removed. Therefore, the pressure-sensitive adhesive sheet is required to be lightly peelable for improved peeling workability.

Conventional pressure-sensitive adhesive sheets with high wetting ability and light peelability are produced using silicone-based pressure-sensitive adhesives. However, silicone-based pressure-sensitive adhesives are expensive and less economical and may cause staining with the silicone itself, which means that they are unsuitable for use in fields where staining can cause a serious problem, such as a process of manufacturing electronic components or the like.

On the other hand, the use of acrylic pressure-sensitive adhesives is disclosed (Patent Documents 1 to 3), which can be an alternative to the use of silicone-based pressure-sensitive adhesives. Unfortunately, acryl-based polymers in acrylic pressure-sensitive adhesives have the following problem. Acryl-based polymers have a C—C—C bond as a main component of the polymer skeleton and therefore have a structure in which free rotation of the bond in the polymer chain is restricted, so that the motion of the polymer molecule is restricted. Therefore, acrylic pressure-sensitive adhesives are less likely to have good wetting ability.

PRIOR ART DOCUMENTS

Patent Documents

JP-A-2007-327012
JP-A-2010-248489
JP-A-2010-209324

SUMMARY OF THE INVENTION

Problems to be Solved by the Invention

In view of the above circumstances, it is therefore an object of the invention to provide a polyester-based pressure-sensitive adhesive composition having high wetting ability and superior adherability and light peelability and to provide a pressure-sensitive adhesive sheet produced with such a pressure-sensitive adhesive composition.

Means for Solving the Problems

As a result of intensive studies to solve the problems, the inventors have found the polyester-based pressure-sensitive adhesive composition and the pressure-sensitive adhesive sheet described below, and thus have accomplished the invention.

Specifically, the invention is directed to a polyester-based pressure-sensitive adhesive composition, including: a polyester obtained by polycondensation of a difunctional or polyfunctional carboxylic acid and a diol; a fatty acid ester; and a crosslinking agent, wherein the polyester has a weight average molecular weight of 8,500 to 50,000, and the fatty acid ester has no additional functional group and has a molecular weight of 200 to 700, the polyester-based pressure-sensitive adhesive composition containing 10 to 150 parts by weight of the fatty acid ester based on 100 parts by weight of the polyester.

In the polyester-based pressure-sensitive adhesive composition of the invention, the crosslinking agent is preferably an isocyanate crosslinking agent.

The invention is also directed to a pressure-sensitive adhesive sheet, including: a support; and a pressure-sensitive adhesive layer formed on at least one side of the support through crosslinking of the polyester-based pressure-sensitive adhesive composition.

In the pressure-sensitive adhesive sheet of the invention, the pressure-sensitive adhesive layer preferably has a gel fraction of 40 to 90% by weight.

The pressure-sensitive adhesive sheet of the invention preferably has an adhesive strength of 0.1 N/25 mm or less to a glass surface.

The pressure-sensitive adhesive sheet of the invention preferably has a wetting speed of 9 $cm^2$/second or more on a glass surface.

Effect of the Invention

The invention is useful in that it makes it possible to provide a polyester-based pressure-sensitive adhesive composition suitable for use in the production of a pressure-sensitive adhesive sheet that does not contain any expensive silicone-based pressure-sensitive adhesive, has good wetting ability on an adherend, is less likely to trap air bubbles, is attachable by hand, and has superior adherability and light peelability, and the invention is also useful in that it makes it possible to provide a pressure-sensitive adhesive sheet produced with such a pressure-sensitive adhesive composition.

MODE FOR CARRYING OUT THE INVENTION

Hereinafter, embodiments of the invention will be described in detail.

<Polyester>

The polyester used in the polyester-based pressure-sensitive adhesive composition of the invention is characterized in that it is obtained by polycondensation of a difunctional or polyfunctional carboxylic acid and a diol and has a weight average molecular weight of 8,500 to 50,000. The polyester with a weight average molecular weight of 8,500 to 50,000 can have a short distance between crosslinking points and a high cohesive strength, which will make it possible to design a hard pressure-sensitive adhesive (with improved scratch resistance), to keep the adhesive strength low (low adherability and light peelability), and to suppress the trapping of air bubbles (to achieve high wetting ability) and thus is preferred. In addition, the polyester-based pressure-sensitive adhesive including the polyester generally has a high level of electrical insulating properties, mechanical strength, bending fatigue strength, water and chemical resistance, and optical transparency. The polyester-based pressure-sensitive adhesive also hardly expands or contracts and can be applied both thickly and thinly. Therefore, the polyester-based pressure-sensitive adhesive is useful for a variety of applications.

The polyester includes at least a component derived from a difunctional or polyfunctional carboxylic acid, which is preferably a dicarboxylic acid having two carboxyl groups per molecule. The difunctional or polyfunctional carboxylic acid is preferably used, so that flexibility and cohesiveness can be achieved at the same time.

Examples of the dicarboxylic acid include, but are not limited to, sebacic acid derived from castor oil and dimer acids derived from oleic acid, erucic acid, and other acids; and other dicarboxylic acids such as aliphatic or alicyclic dicarboxylic acids such as adipic acid, azelaic acid, 1,4-cyclohexanedicarboxylic acid, 4-methyl-1,2-cyclohexanedicarboxylic acid, dodecenyl succinic anhydride, fumaric acid, succinic acid, dodecanedioic acid, hexahydrophthalic anhydride, tetrahydrophthalic anhydride, maleic acid, maleic anhydride, itaconic acid, and citraconic acid; and terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenyl ether dicarboxylic acid. In particular, dimer acids are preferred because they have low glass transition temperature, make it possible to design a flexible pressure-sensitive adhesive, and can provide good wetting ability. Dimer acids are also useful because they are not derived from petroleum (but derived from plants) and thus are environmentally friendly. These dicarboxylic acids may be used singly or in combination of two or more.

A monocarboxylic acid with one carboxyl group (making up less than 3% by weight of all the carboxylic acids) or a tri- or polycarboxylic acid with three or more carboxyl groups (making up less than 25% by weight of all the carboxylic acids) may also be used in addition to the dicarboxylic acid. However, when a polyfunctional carboxylic acid such as a tricarboxylic acid is used, a network structure (three-dimensional crosslinked structure) can be formed to keep the adhesive strength (adhering strength) of the pressure-sensitive adhesive layer (pressure-sensitive adhesive tape) at a low level. Therefore, when high adhesion is necessary, the tricarboxylic or polycarboxylic acid should preferably not be used.

The polyester also includes a component derived from a diol, which preferably has at least two hydroxyl groups (hydroxy groups) per molecule. In particular, an aliphatic diol or a polyether glycol is preferably used. Using the diol, an easily rotatable ether bond can be introduced into the polymer, which can improve wetting ability and therefore is preferred.

In particular, the aliphatic diol is preferably an aliphatic diol having an alkylene group of 3 to 10 carbon atoms. An aliphatic diol with an alkylene group of less than 3 carbon atoms has a relatively low boiling point and thus can evaporate during the polymerization for the polyester, so that the viscosity can easily increase and the polymerization can be difficult to control. On the other hand, an aliphatic diol with an alkylene group of more than 10 carbon atoms is not preferred because it can easily crystallize and is disadvantageous in terms of cost.

Examples of the aliphatic diol having an alkylene group of 3 to 10 carbon atoms include, but are not limited to, aliphatic glycols such as 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol. These diols may be used singly or in combination two or more.

The polyether glycol, which has an ether bond in the molecule, can introduce the ether bond together with an ester bond into the polymer chain of the polyester, so that bonds in the resulting polymer chain structure can easily undergo free rotation, which can improve the flexibility of the polyester and be more effective for wetting ability and thus is preferred.

As a non-limiting example, the use of a polyether glycol having hydroxyl groups at both ends can further increase the flexibility of the polymer chain and thus is preferred. Preferred examples of the polyether glycol having hydroxyl groups at both ends, which may have any number average molecular weight (Mn), include polyalkylene ether glycols such as polytetramethylene ether glycols and polytrimethylene ether glycols; polyether polyols produced by copolymerization of 1 to 20% by mole of 3-methyltetrahydrofuran and tetrahydrofuran (e.g., PTG-L1000, PTG-L2000, and PTG-L3500 manufactured by Hodogaya Chemical Co., Ltd.), and polyether glycols produced by copolymerization of neopentylglycol and tetrahydrofuran. These polyether glycols may be used singly or in combination of two or more.

The polyester can be obtained by polycondensation of the carboxylic acid and the diol. The molar ratio (OH/COOH) of the hydroxyl group of the diol to the carboxyl group of the carboxylic acid is preferably 1 or more, more preferably 1.02 to 3, even more preferably 1.04 to 2.60, further more preferably 1.06 to 2.40. If the molar ratio is less than 1, a carboxyl group-terminated polyester (polymer) will be produced after the polymerization, which may fail to be quickly crosslinked with a crosslinking agent (such as an isocyanate crosslinking agent) and may form a pressure-sensitive adhesive (layer) with insufficient holding power (cohesive strength) and thus is not preferred.

The polyester used in the invention has a weight average molecular weight (Mw) of 8,500 to 50,000, preferably 8,800 to 45,000, more preferably 9,000 to 43,000, even more preferably 10,000 to 38,000. If the weight average molecular weight is less than 8,500, air bubbles can easily form during a crosslinking reaction with a crosslinking agent (such as a polyfunctional isocyanate), and an appearance problem such as cissing or uneven thickness can be more likely to occur in a coating process due to low viscosity, which is not preferred. If the weight average molecular weight is more than 50,000, the resulting adhesive strength can be high, and the stability of the polymerization can decrease.

An additional component other than the carboxylic acid and the diol may be introduced into the polyester by polymerization or addition after the polymerization as long as it does not degrade the properties of the polyester to be used in the pressure-sensitive adhesive layer of the invention.

The polyester can be synthesized using any known polymerization method. The polymerization (condensation polymerization) reaction between the carboxylic acid and the diol may be performed using a conventionally known method with a solvent or under reduced pressure with no solvent.

The method for removing water produced in the polymerization (polycondensation) reaction may be a method of removing water by azeotrope with toluene or xylene, a method of blowing inert gas into the reaction system so that the produced water and monoalcohol can be discharged together with the inert gas to the outside of the reaction system, a method of removing water by distillation under reduced pressure, or the like.

Any polymerization catalyst generally used for polyester may be used in the polymerization (polycondensation) reaction. Examples of polymerization catalysts that may be used include, but are not limited to, various metal compounds such as titanium compounds, tin compounds, antimony compounds, zinc compounds, and germanium compounds, and strong acid compounds such as p-toluenesulfonic acid and sulfuric acid.

<Fatty Acid Ester>

In addition to the polyester, the pressure-sensitive adhesive composition of the invention contains a fatty acid ester that has no additional functional group and has a molecular weight of 200 to 700 (g/mol in molar molecular weight). The fatty acid ester preferably has a molecular weight of 220 to 600, more preferably 240 to 500. The fatty acid ester has an ester bond like the polyester. Therefore, there is good compatibility between the fatty acid ester and the polyester. The interaction between their ester bonds can prevent bleeding out of a liquid material even when the liquid material is added in a large amount, which is preferred for anti-staining properties. The addition of the fatty acid ester can also increase the mobility of the polyester and dramatically improve the ability of the pressure-sensitive adhesive sheet (pressure-sensitive adhesive layer) according to the invention to wet the surface of the adherend, which is therefore preferred. In addition, the fatty acid ester plays a role to widen the distance between crosslinking points in the polyester (polymer) (a role to allow the polymer to swell), does not react with the polyester, crosslinking agents, and other components, and can reduce the steric hindrance of the polyester, increase the mobility of the polyester molecule, and improve the wetting ability. In this regard, if the fatty acid ester has a molecular weight of less than 200, it will have a relatively low boiling point and thus can evaporate in a drying process, which can make it impossible to produce the effects of the fatty acid ester. On the other hand, a fatty acid ester with a molecular weight of more than 700 may have reduced compatibility with the polyester, may bleed out, and may stain the adherend.

The fatty acid ester may be, for example, isopropyl myristate, isopropyl palmitate, methyl linoleate, or a dibasic acid ester such as an adipic acid ester, a sebacic acid ester, or a phthalic acid ester. These fatty acid esters may be used singly or in combination of two or more. If a fatty acid ester having an additional functional group such as a hydroxyl group is used, the functional group can be incorporated during a crosslinking reaction, so that the fatty acid ester may fail to impart flexibility and fail to be effective for wetting ability. The use of other additives with no ester bond is not preferred because such additives can have lower compatibility with the polyester and can bleed out to cause staining.

The content of the fatty acid ester is from 10 to 150 parts by weight, preferably from 20 to 150 parts by weight, more preferably from 30 to 140 parts by weight, even more preferably from 40 to 130 parts by weight, based on 100 parts by weight of the polyester. If the content is less than 10 parts by weight, the resulting pressure-sensitive adhesive layer may be less likely to have high wetting ability. If the content is more than 150 parts by weight, a reduction in scratch resistance may occur. Therefore, such contents are not preferred.

<Crosslinking Agent>

In addition to the polyester, the pressure-sensitive adhesive composition of the invention contains a crosslinking agent. Using the crosslinking agent, the pressure-sensitive adhesive composition can be subjected to a crosslinking reaction to form a pressure-sensitive adhesive layer. The crosslinking agent may be any conventionally known crosslinking agent, examples of which include an isocyanate crosslinking agent such as a polyvalent isocyanurate or a polyfunctional isocyanate compound, a polyfunctional melamine compound, a polyfunctional epoxy compound, a polyfunctional oxazoline compound, a polyfunctional aziridine compound, and a metal chelate compound. These crosslinking agents may be used singly or in combination of two or more. In a particularly preferred mode, a conventionally known isocyanate crosslinking agent such as a polyvalent isocyanurate or a polyfunctional isocyanate is used in order to obtain a transparent pressure-sensitive adhesive layer, a pressure-sensitive adhesive sheet (pressure-sensitive adhesive layer) with a high gel fraction, or an elastic modulus suitable for pressure-sensitive adhesives.

Examples of the polyvalent isocyanurate include a polyisocyanurate of hexamethylene diisocyanate and the like. The polyvalent isocyanurate can be effectively used for the purpose of obtaining a pressure-sensitive adhesive layer with high transparency or high gel fraction. The polyvalent isocyanurate to be used may be a commercially available product such as Duranate TPA-100 (trade name) manufactured by Asahi Kasei Chemicals Corporation and CORONATE HK (trade name), CORONATE HX (trade name), CORONATE 2096 (trade name) manufactured by Nippon Polyurethane Industry Co., Ltd.

The polyfunctional isocyanate compound is preferably, for example, a compound having at least two isocyanate groups per molecule. More preferably, the polyfunctional isocyanate compound is any compound having three or more isocyanate groups per molecule. Examples include aliphatic polyisocyanates, alicyclic polyisocyanates, aromatic polyisocyanates, and the like.

Examples of the aliphatic polyisocyanates include 1,2-ethylene diisocyanate, tetramethylene diisocyanates such as 1,2-tetramethylene diisocyanate, 1,3-tetramethylene diisocyanate, and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, and 2,5-hexamethylene diisocyanate; and 2-methyl-1,5-pentane diisocyanate, 3-methyl-1,5-pentane diisocyanate, and lysine diisocyanate.

Examples of the alicyclic polyisocyanates include isophorone diisocyanate; cyclohexyl diisocyanates such as 1,2-cyclohexyl diisocyanate, 1,3-cyclohexyl diisocyanate, and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

Besides the aliphatic, alicyclic, and aromatic polyisocyanates, examples of the polyfunctional isocyanate compound that may be used include dimers or trimers of aromatic aliphatic polyisocyanates, such as dimers or trimers of diphenylmethane diisocyanate, a reaction product of trimethylolpropane and tolylene diisocyanate, a reaction product of trimethylolpropane and hexamethylene diisocyanate, polymethylene polyphenyl iso cyanate, polyether-polyisocyanate, polyester-polyisocyanate, and other polymers.

Commercially available products of the polyfunctional isocyanate compound may also be used, examples of which include CORONATE L (trade name, manufactured by Nippon Polyurethane Industry Co., Ltd.) as a trimer adduct of trimethylolpropane and tolylene diisocyanate, and CORONATE HL (trade name, manufactured by Nippon Polyurethane Industry Co., Ltd.) as a trimer adduct of trimethylolpropane and hexamethylene diisocyanate.

Examples of the polyfunctional melamine compound include methylated methylol melamine and butylated hexamethylol melamine. Examples of the polyfunctional epoxy compound include diglycidyl aniline and glycerin diglycidyl ether.

The type and content of the crosslinking agent are not restricted. When used for the pressure-sensitive adhesive sheet, the composition preferably contains the crosslinking agent in such an amount that it can form a pressure-sensitive adhesive layer with a gel fraction of 40 to 90% by weight, more preferably 40 to 89% by weight, even more preferably 50 to 88% by weight, further more preferably 60 to 80% by weight. The adhesive (pressure-sensitive adhesive) with a gel fraction of less than 40% by weight can be soft and more likely to trap air bubbles when attached to an adherend. On the other hand, the adhesive with a gel fraction of more than 90% by weight can be less wetting and spreading and have a lower wetting speed.

The content of the crosslinking agent is preferably from 1 to 30 parts by weight, more preferably from 2 to 25 parts by weight, even more preferably from 5 to 20 parts by weight, based on 100 parts by weight of the polyester. If the content is less than 1 part by weight, the resulting pressure-sensitive adhesive layer may fail to have improved holding power (cohesive strength) and may have reduced heat resistance. If the content is more than 30 parts by weight, the crosslinking reaction may excessively proceed to reduce the adhesive strength. Therefore, such contents are not preferred.

A crosslinking catalyst may also be used as appropriate to efficiently control the gel fraction of the pressure-sensitive adhesive layer for use in the protective pressure-sensitive adhesive sheet of the invention. Examples of the catalyst include tetra-n-butyl titanate, tetraisopropyl titanate, butyltin oxide, dioctyltin dilaurate, and acetylacetone iron (III). These catalysts may be used singly or in combination of two or more.

The amount of the catalyst is preferably, but not limited to, 0.01 to 1 part by weight, more preferably 0.05 to 0.5 parts by weight, based on 100 parts by weight of the polymer (such as the polyester) as a main component of the pressure-sensitive adhesive. If the amount is less than 0.01 parts by weight, the addition of the catalyst may fail to be effective, and if the amount is more than 1 part by weight, the pressure-sensitive adhesive may have a significantly short shelf-life and decrease in application stability.

To extend the shelf life, a retarder such as acetyl acetone, methanol, or methyl orthoacetate may be added as needed.

The pressure-sensitive adhesive composition (pressure-sensitive adhesive layer) of the invention may contain a common additive such as a tackifier, a hydrolysis resistant agent, a silane coupling agent, a surface lubricant, a leveling agent, an antioxidant, a polymerization inhibitor, an ultraviolet absorber, a light stabilizer, a release modifier, a plasticizer, a softening agent, an antistatic agent, a filler, a colorant such as a pigment or a dye, an age resistor, or a surfactant as long as the properties of the pressure-sensitive adhesive composition (pressure-sensitive adhesive layer) of the invention are not impaired.

The thickness of the pressure-sensitive adhesive layer (after drying) may be selected as appropriate. For example, the pressure-sensitive adhesive layer (after drying) preferably has a thickness of about 1 to about 100 µm, more preferably about 3 to about 80 µm, even more preferably about 5 to about 60 µm. If the thickness of the pressure-sensitive adhesive layer is less than 1 µm, sufficient adhesive strength can be difficult to obtain, and the pressure-sensitive adhesive sheet (pressure-sensitive adhesive layer) itself may fail to be secured to the object or may easily peel off. On the other hand, if the thickness of the pressure-sensitive adhesive layer is more than 100 µm, the adhesive strength may increase over time, so that the pressure-sensitive adhesive layer may become difficult to peel off, which is not preferred. The pressure-sensitive adhesive layer may have a single-layer or multilayer structure.

The pressure-sensitive adhesive sheet of the invention preferably includes a support and a pressure-sensitive adhesive layer formed on at least one side of the support through crosslinking of the polyester-based pressure-sensitive adhesive composition. By containing the support, the pressure-sensitive adhesive sheet can have improved durability, mechanical strength, handleability, and protective properties, which is preferred.

<Support>

The support may be of any conventionally known type, such as a plastic film, a paper sheet, a porous material such as a nonwoven fabric, or any of various other supports (backings). In view of durability and other properties, a plastic film is preferably used for surface protection applications. The plastic film may be, for example, a film of polyolefin such as polyethylene, polypropylene, poly-1-butene, poly-4-methyl-1-pentene, an ethylene-propylene copolymer, an ethylene-1-butene copolymer, an ethylene-vinyl acetate copolymer, an ethylene-ethyl acrylate copolymer, or an ethylene-vinyl alcohol copolymer, a film of polyester such as polyethylene terephthalate, polyethylene naphthalate, or polybutylene terephthalate, a polyacrylate film, a polystyrene film, a film of polyamide such as nylon 6, nylon 6,6, or partially aromatic polyamide, a polyvinyl chloride film, a polyvinylidene chloride film, a polycarbonate film, a polylactic acid film, or a cellulose film.

If necessary, the support may contain any of various additives used in backings (supports) for general pressure-sensitive adhesive tapes, such as an ultraviolet absorber, a light stabilizer, an antioxidant, an antistatic agent, a filler, a pigment, and a dye.

If necessary, the surface of the support (backing) may be subjected to a common surface treatment for improving its adhesion to the pressure-sensitive adhesive layer, such as a chromic acid treatment, exposure to ozone, exposure to flame, exposure to high-voltage electric shock, an ionizing radiation treatment, or other chemical or physical oxidation treatments, or a coating treatment with a priming agent. The surface of the support may also be subjected to an antifouling treatment with a silica powder or other materials or subjected to an antistatic treatment of a coating, kneading, or vapor-deposition type. In order for various pressure-sensitive adhesive layers to be removably formed on the support, the support may also be coated with a release agent such as a silicone resin or a fluororesin.

When used to form the pressure-sensitive adhesive sheet of the invention, the support may also have an intermediate layer or an undercoat layer with no problem as long as the properties of the support are not impaired.

The thickness of the support (backing) may be appropriately selected depending on the material or shape of the support. For example, the support preferably has a thickness of 1,000 μm or less, more preferably about 1 to about 1,000 μm, even more preferably about 2 to about 500 μm, furthermore preferably about 3 to about 300 μm, still more preferably about 5 to about 250 μm.

The pressure-sensitive adhesive layer may be formed using any conventionally known method. For example, the pressure-sensitive adhesive layer may be formed according to a known method for producing a pressure-sensitive adhesive sheet, such as a method that includes applying the pressure-sensitive adhesive composition (a solution of the pressure-sensitive adhesive composition in a solvent or a hot melt thereof) to the support (backing) and drying the composition to form a pressure-sensitive adhesive layer; a method that includes applying the pressure-sensitive adhesive composition to the support, drying the composition to form a pressure-sensitive adhesive composition layer, and further crosslinking it to form a pressure-sensitive adhesive layer; a method that includes forming a pressure-sensitive adhesive layer on the release liner described below by coating and then moving (transferring) the pressure-sensitive adhesive layer onto the support; a method of applying a pressure-sensitive adhesive layer-forming material to the support by extrusion; a method of extruding a support and a pressure-sensitive adhesive layer in two or more layers; or a method of laminating a single pressure-sensitive adhesive layer onto the support. The pressure-sensitive adhesive layer may also be formed using a method of co-extruding a thermoplastic resin support and a pressure-sensitive adhesive layer in two or more layers by inflation method or T-die method. For the purpose of the invention, the term "pressure-sensitive adhesive sheet" is intended to include a pressure-sensitive adhesive film, a pressure-sensitive adhesive tape, a double-sided pressure-sensitive adhesive tape (a pressure-sensitive adhesive layer alone, a backing-less tape, or a double-sided pressure-sensitive adhesive tape having a support (backing)), and other possible sheets. Before use, a release liner or liners may be attached to one or both sides of the pressure-sensitive adhesive layer for its storage. The pressure-sensitive adhesive layer may be a stack (laminate) of two or more layers made of the same or different materials and bonded together. The pressure-sensitive adhesive sheet may also be designed to have two or more support layers and three or more pressure-sensitive adhesive layers (such as a double-sided pressure-sensitive adhesive tape).

The pressure-sensitive adhesive composition (solution) may be applied using a conventionally known method such as roll coating, gravure coating, reverse roll coating, roll brush coating, air knife coating, spray coating, or extrusion coating with a die coater or the like.

The release liner may be any conventionally-known appropriate release liner. For example, the release liner to be used may include a backing (a backing for a release liner) and a release coating layer that is formed on at least one side of the backing by a coating treatment with a parting agent (release agent) for imparting releasability, such as a silicone release agent, a fluoride release agent, a long-chain alkyl release agent, or a fatty acid amide release agent. The backing for the release liner may have a single-layer or multilayer structure.

Any of various thin materials such as plastic films, paper sheets, foamed products, and metal foils may be used as the release liner backing. A plastic film is particularly preferred. Examples of the material for the plastic film include polyester such as polyethylene terephthalate, polyolefin such as polypropylene or ethylene-propylene copolymer, and thermoplastic resin such as polyvinyl chloride.

The thickness of the release liner backing may be selected as appropriate, depending on the purpose.

As a non-limiting example, the pressure-sensitive adhesive layer may be formed by a process that includes applying the pressure-sensitive adhesive composition (solution) and then drying the composition at a temperature of generally 60 to 150° C., preferably 70 to 140° C.

<Applications>

The pressure-sensitive adhesive sheet of the invention will have general-purpose applications such as surface protective sheets for electronic device displays, protective sheets for electric appliances, and packaging sheets.

EXAMPLES

Hereinafter, the invention will be more specifically described with reference to examples, which however are not intended to limit the invention. In the examples, "parts" refers to "parts by weight". The physical properties of polyester, the formulation of the polyester-based pressure-sensitive adhesive composition, and the evaluation results of the pressure-sensitive adhesive sheet are shown in Tables 1 to 3.

<Preparation of Polymer A>

A four-necked separable flask equipped with a stirrer, a thermometer, and a vacuum pump was charged with 25 g of a dimer acid (Pripol 1009 (trade name) manufactured by Croda, 567 in molar molecular weight), 175 g of a polyether glycol (PTG-L3000 (trade name) manufactured by Hodogaya Chemical Co., Ltd., 3,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol (the molar ratio between the carboxyl group of the carboxylic acid and the hydroxyl group of the diol (COOH:OH)) was 1.00 (COOH):1.34 (OH). The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 42,000.

<Preparation of Polymer B>

A four-necked separable flask equipped with a stirrer, a thermometer, and a vacuum pump was charged with 35 g of a dimer acid (Pripol 1009 (trade name) manufactured by Croda, 567 in molar molecular weight), 165 g of a polyether glycol (PTG2000SN(P) (trade name) manufactured by Hodogaya Chemical Co., Ltd., 2,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.33. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 32,000.

<Preparation of Polymer C>

A four-necked separable flask equipped with a stirrer, a thermometer, and a vacuum pump was charged with 60 g of a dimer acid (Pripol 1025 (trade name) manufactured by Croda, 621 in molar molecular weight), 140 g of a polyether glycol (PTG1000SN(P) (trade name) manufactured by Hodogaya Chemical Co., Ltd., 1,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.32. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 30,000.

<Preparation of Polymer D>

A four-necked separable flask equipped with a stirrer, a thermometer, and a vacuum pump was charged with 55 g of a dimer acid (Pripol 1025 (trade name) manufactured by Croda, 621 in molar molecular weight), 145 g of a polyether glycol (PTG1000SN(P) (trade name) manufactured by Hodogaya Chemical Co., Ltd., 1,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.49. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 20,000.

<Preparation of Polymer E>

A four-necked separable flask equipped with a stirrer, a thermometer, and a vacuum pump was charged with 50 g of a dimer acid (Pripol 1025 (trade name) manufactured by Croda, 621 in molar molecular weight), 150 g of a polyether glycol (Cerenol H1000 (trade name) manufactured by DuPont, 1,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.70. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 15,000.

<Preparation of Polymer F>

A four-necked separable flask equipped with a stirrer, a thermometer, and a vacuum pump was charged with 40 g of a dimer acid (Pripol 1025 (trade name) manufactured by Croda, 621 in molar molecular weight), 160 g of a polyether glycol (PTG1000SN(P) (trade name) manufactured by Hodogaya Chemical Co., Ltd., 1,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:2.26. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 9,000.

<Preparation of Polymer G>

A four-necked separable flask equipped with a stirrer, a thermometer, and a vacuum pump was charged with 80 g of a dimer acid (Pripol 1009 (trade name) manufactured by Croda, 567 in molar molecular weight), 120 g of a polyether glycol (PTMG650 (trade name) manufactured by Mitsubishi Chemical Corporation, 650 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.30. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 9,000.

<Preparation of Polymer H>

A four-necked separable flask equipped with a stirrer, a thermometer, and a vacuum pump was charged with 98 g of a dimer acid (Pripol 1009 (trade name) manufactured by Croda, 567 in molar molecular weight), 102 g of a dimer diol (Pripol 2033 (trade name) manufactured by Croda, 537 in molar molecular weight), and 0.2 g of dibutyltin oxide (manufactured by Wako Pure Chemical Industries, Ltd.) as a polymerization catalyst. The molar ratio between the dimer acid as a carboxylic acid and the dimer diol as a diol was 1.00:1.10. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 28,000.

<Preparation of Polymer I>

A four-necked separable flask equipped with a stirrer, a thermometer, a nitrogen inlet tube, and a trap-equipped condenser tube was charged with 166 g of a dimer acid (Pripol 1009 (trade name) manufactured by Croda, 567 in molar molecular weight), 34 g of 1,4-butanediol (manufactured by Wako Pure Chemical Industries, Ltd., 90 in molar molecular weight), and 0.2 g of dibutyltin oxide (manufactured by Wako Pure Chemical Industries, Ltd.) as a polymerization catalyst. The molar ratio between the dimer acid as a carboxylic acid and 1,4-butanediol as a diol was 1.00:1.28. The mixture was heated to 180° C. with stirring under a nitrogen atmosphere, and then this temperature was maintained for 8 hours. Subsequently, the trap was closed, and the nitrogen inlet tube was replaced by a vacuum pump. The mixture was heated to 200° C. with stirring under a reduced-pressure atmosphere (0.002 MPa), and then this temperature was maintained. The reaction was continued for about 7 hours to produce a polyester polymer. The polymer had a weight average molecular weight (Mw) of 10,000.

<Preparation of Polymer J>

A four-necked separable flask equipped with a stirrer, a thermometer, and a vacuum pump was charged with 39 g of a dimer acid (Pripol 1025 (trade name) manufactured by Croda, 621 in molar molecular weight), 161 g of a polyether glycol (PTG2000SN(P) (trade name) manufactured by Hodogaya Chemical Co., Ltd., 2,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.17. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 54,000.

<Preparation of Polymer K>

A four-necked separable flask equipped with a stirrer, a thermometer, and a vacuum pump was charged with 37 g of a dimer acid (Pripol 1009 (trade name) manufactured by Croda, 567 in molar molecular weight), 163 g of a polyether glycol (SANNIX PP-2000 (trade name) manufactured by Sanyo Chemical Industries, Ltd., 2,000 in number average molecular weight (Mn)), and 0.2 g of dibutyltin oxide (manufactured by Wako Pure Chemical Industries, Ltd.) as a polymerization catalyst. The molar ratio between the dimer acid as a carboxylic acid and the polyether glycol as a diol was 1.00:1.24. The mixture was heated to 200° C. with stirring under a reduced-pressure atmosphere (0.002 MPa), and then this temperature was maintained. The reaction was continued for about 5 hours to produce a polyester polymer. The polymer had a weight average molecular weight (Mw) of 8,000.

stand at 40° C. for 3 days to give a pressure-sensitive adhesive sheet having the pressure-sensitive adhesive layer formed on the support.

Example 2

To 100 parts of polymer B were added 50 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-

TABLE 1

| Polymer No. | Carboxylic acid Type | Carboxylic acid Added amount (g) | Diol Type | Diol Added amount (g) | Molar ratio OH/COOH | Weight average molecular weight (Mw) |
|---|---|---|---|---|---|---|
| A | PRIPOL1009 | 25 | PTG-L3000 | 175 | 1.34 | 42,000 |
| B | PRIPOL1009 | 35 | PTG2000SN (P) | 165 | 1.33 | 32,000 |
| C | PRIPOL1025 | 60 | PTG1000SN (P) | 140 | 1.32 | 30,000 |
| D | PRIPOL1025 | 55 | PTG1000SN (P) | 145 | 1.49 | 20,000 |
| E | PRIPOL1025 | 50 | Cerenol H1000 | 150 | 1.70 | 15,000 |
| F | PRIPOL1025 | 40 | PTG1000SN (P) | 160 | 2.26 | 9,000 |
| G | PRIPOL1009 | 80 | PTMG650 | 120 | 1.30 | 9,000 |
| H | PRIPOL1009 | 98 | PRIPOL2033 | 102 | 1.10 | 28,000 |
| I | PRIPOL1009 | 166 | 1,4-butanediol | 34 | 1.28 | 10,000 |
| J | PRIPOL1025 | 39 | PTG2000SN (P) | 161 | 1.17 | 54,000 |
| K | PRIPOL1009 | 37 | PP-2000 | 163 | 1.24 | 8,000 |

Example 1

To 100 parts of polymer A were added 50 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 3

To 100 parts of polymer D were added 50 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 4

To 100 parts of polymer E were added 50 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 5

To 100 parts of polymer F were added 50 parts of methyl linoleate (VEGE-SOL CM (trade name) manufactured by KANEDA Co., Ltd., 295 in molar molecular weight) as a fatty acid ester and 20 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 6

To 100 parts of polymer G were added 50 parts of methyl linoleate (VEGE-SOL CM (trade name) manufactured by KANEDA Co., Ltd., 295 in molar molecular weight) as a fatty acid ester and 20 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 7

To 100 parts of polymer H were added 50 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 8

To 100 parts of polymer I were added 50 parts of methyl linoleate (VEGE-SOL CM (trade name) manufactured by KANEDA Co., Ltd., 295 in molar molecular weight) as a fatty acid ester and 20 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 9

To 100 parts of polymer C were added 50 parts of isopropyl myristate (manufactured by Wako Pure Chemical Industries, Ltd., 270 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 10

To 100 parts of polymer C were added 50 parts of isopropyl palmitate (manufactured by Wako Pure Chemical Industries, Ltd., 299 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 11

To 100 parts of polymer C were added 50 parts of diisodecyl adipate (DIDA (trade name) manufactured by DAIHACHI CHEMICAL INDUSTRY CO., LTD., 427 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 12

To 100 parts of polymer C were added 50 parts of dioctyl sebacate (DOS (trade name) manufactured by DAIHACHI CHEMICAL INDUSTRY CO., LTD., 427 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 13

To 100 parts of polymer C were added 50 parts of dioctyl phthalate (DOP (trade name) manufactured by DAIHACHI CHEMICAL INDUSTRY CO., LTD., 390 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 14

To 100 parts of polymer C were added 50 parts of bis(2-(2-butoxyethoxy)ethyl) adipate (BXA-N(trade name)

manufactured by DAIHACHI CHEMICAL INDUSTRY CO., LTD., 435 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 15

To 100 parts of polymer C were added 10 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 16

To 100 parts of polymer C were added 50 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 17

To 100 parts of polymer C were added 100 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 18

To 100 parts of polymer C were added 150 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 19

To 100 parts of polymer C were added 10 parts of dioctyl adipate (DOA (trade name) manufactured by DAIHACHI CHEMICAL INDUSTRY CO., LTD., 371 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 20

To 100 parts of polymer C were added 50 parts of dioctyl adipate (DOA (trade name) manufactured by DAIHACHI CHEMICAL INDUSTRY CO., LTD., 371 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 21

To 100 parts of polymer C were added 100 parts of dioctyl adipate (DOA (trade name) manufactured by DAIHACHI CHEMICAL INDUSTRY CO., LTD., 371 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Example 22

To 100 parts of polymer C were added 150 parts of dioctyl adipate (DOA (trade name) manufactured by DAIHACHI CHEMICAL INDUSTRY CO., LTD., 371 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 1

To 100 parts of polymer C were added 50 parts of a hydrocarbon oil (P-55 (trade name) manufactured by MORESCO Corporation, 300 in molar molecular weight) and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 2

To 100 parts of polymer C were added 5 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 3

To 100 parts of polymer C were added 200 parts of methyl linoleate (VEGE-SOL CM (trade name) manufactured by KANEDA Co., Ltd., 295 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 4

To 100 parts of polymer C was added 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 5

A four-necked flask equipped with a stirring blade, a thermometer, a nitrogen gas inlet tube, and a reflux condenser was charged with 200 g of 2-ethylhexyl acrylate, 8 g of 2-hydroxyethyl acrylate, 0.4 g of 2,2'-azobisisobutyronitrile as a polymerization initiator, and 312 g of ethyl acetate. Nitrogen gas was introduced into the flask while the mixture was gently stirred, and a polymerization reaction was performed for about 6 hours while the temperature of the liquid in the flask was kept at about 65° C., so that a solution (40% by weight) of an acryl-based polymer was obtained. The acryl-based polymer had a weight average molecular weight (Mw) of 500,000.

To 100 parts of the acryl-based polymer solution were added 50 parts of methyl linoleate (VEGE-SOL CM (trade name) manufactured by KANEDA Co., Ltd., 295 in molar molecular weight) as a fatty acid ester, 4 parts of a polyisocyanate (CORONATE L (trade name) manufactured by Nippon Polyurethane Industry Co., Ltd.) as a crosslinking agent, and 0.2 parts of dibutyltin dilaurate (a 1% by weight ethyl acetate solution) as a crosslinking catalyst, so that a pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 6

Each of the properties of a silicone (Si)-based surface protective sheet (DW-100 (trade name) manufactured by Nitto Denko Corporation) was evaluated.

Comparative Example 7

To 100 parts of polymer J were added 50 parts of methyl linoleate (VEGE-SOL CM (trade name) manufactured by KANEDA Co., Ltd., 295 in molar molecular weight) as a fatty acid ester and 10 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 8

To 100 parts of polymer K were added 50 parts of methyl linoleate (VEGE-SOL CM (trade name) manufactured by KANEDA Co., Ltd., 295 in molar molecular weight) as a fatty acid ester and 20 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 9

To 100 parts of polymer C were added 50 parts of ethyl enanthate (manufactured by Tokyo Chemical Industry Co., Ltd., 158 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 10

To 100 parts of polymer C were added 50 parts of an adipic acid-based polyester (D620 (trade name) manufactured by J-PLUS Co., Ltd., 800 in molar molecular weight) as a fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

Comparative Example 11

To 100 parts of polymer C were added 50 parts of glyceryl stearate (Atmer 129V (trade name) manufactured by Croda, 359 in molar molecular weight) as a polyalcohol fatty acid ester and 15 parts of a polyisocyanate (CORONATE HX (trade name) manufactured by Nippon Polyurethane Industry Co., Ltd.) as a crosslinking agent. Toluene as a solvent was added to the mixture to adjust the viscosity to a level suitable for easy application, so that a polyester-based pressure-sensitive adhesive composition was obtained. The composition was applied to a 38-μm-thick polyethylene terephthalate (PET) film (Lumirror 38S10 (trade name) manufactured by PANAC Co., Ltd.) as a backing so that a pressure-sensitive adhesive layer with a dry thickness of 10 μm (after drying) could be formed. The composition was then dried at 120° C. for 3 minutes to form a composition layer. Subsequently, the composition layer was attached to the release-treated surface of a release-treated polyethylene terephthalate (PET) film (Diafoil MRE #38 (trade name) manufactured by Mitsubishi Plastics, Inc.) as a support. The resulting laminate was then allowed to stand at 40° C. for 3 days to give a pressure-sensitive adhesive sheet having the pressure-sensitive adhesive layer formed on the support.

<Methods for Measurement and Evaluation>

The polymers for use in the invention, the pressure-sensitive adhesive layers, and the pressure-sensitive adhesive sheets were measured and evaluated by the methods described below.

(Weight Average Molecular Weight (Mw))

The weight average molecular weight (Mw) was measured as follows. About 0.2 g of each polyester or acryl-based polymer was taken in a Petri dish and then dried at 120° C. for 2 hours so that the solvent was removed. Subsequently, 0.01 g of a sample was weighed from the polyester layer on the Petri dish, and then 10 g or tetrahydrofuran (THF) was added to the sample and allowed to stand for 24 hours to form a solution. The solution was subjected to gel permeation chromatography (GPC), by which the weight average molecular weight (Mw) of each polymer was measured from a calibration curve prepared with polystyrene standards.

(Conditions for Measurement of Weight Average Molecular Weight (Mw))

Analyzer: HLC-8220GPC manufactured by Tosoh Corporation
Sample concentration: 0.1% by weight (THF solution)
Sample injection volume: 20 μl
Eluent: THF
Flow rate: 0.300 ml/min
Measurement (column) temperature: 40° C.
Columns: Columns for sample: TSKguard column Super HZ-L (single)+TSKgel Super HZM-M (double) manufactured by Tosoh Corporation
Reference column: TSKgel Super H-RC (single) manufactured by Tosoh Corporation
Detector: differential refractometer (RI)

(Gel Fraction of Pressure-Sensitive Adhesive Layer)

An about 0.1 g piece was cut from the pressure-sensitive adhesive layer obtained in each of the examples and the comparative examples. The cut piece sample was wrapped in a Teflon® sheet whose weight was known, and the total weight was measured. The wrapped sample was allowed to stand in toluene at 23° C. for 7 days, so that the sol fraction was extracted from the sample. Subsequently, the sample was dried at 120° C. for 2 hours, and the dry weight was measured. The gel fraction was calculated from the following formula: gel fraction (% by weight)=[(the weight after drying−the weight of the Teflon® sheet)/(the weight before drying−the weight of the Teflon® sheet)]×100

(Adhesive Strength)

A 25-mm-wide piece was cut from the pressure-sensitive adhesive sheet obtained in each of the examples and the comparative examples. The pressure-sensitive adhesive surface of the cut piece of the pressure-sensitive adhesive sheet was bonded to the non-tin surface of an alkali glass plate (manufactured by Matsunami Glass Ind., Ltd.). The 180° peel adhesive strength (N/25 mm) of the piece was then measured with a tension compression tester (AG-IS (product name) manufactured by SHIMADZU CORPORATION) under the following conditions.
Pulling (peel) rate: 300 mm/minute
Measurement conditions: temperature 23±2° C., humidity 65±5% RH In this regard, the adhesive strength to the non-tin surface (glass surface) of the alkali glass plate (manufactured by Matsunami Glass Ind., Ltd.) is preferably 0.1 N/25 mm or less, more preferably 0.08 N/25 mm or less, even more preferably 0.05 N/25 mm or less. When the adhesive strength is 0.1 N/25 mm or less, the resulting pressure-sensitive adhesive sheet can have light peelability, which is a preferred mode.

(Residual Adhesive Strength)

An optical transparent pressure-sensitive adhesive sheet (CS9662LS (trade name) manufactured by Nitto Denko Corporation) with a polyethylene terephthalate (PET) backing was attached to the non-tin surface of an alkali glass plate (manufactured by Matsunami Glass Ind., Ltd.) and pressure-bonded to the surface with a 2 kg roller moving back and forth once in an atmosphere at a temperature of 23° C. and a humidity of 50%. Thirty minutes after the pressure bonding, the 180° peel adhesive strength A (N/25 mm) of the pressure-sensitive adhesive sheet was measured with a tension compression tester (AG-IS (product name) manufactured by SHIMADZU CORPORATION) under the following conditions.
Pulling (peel) rate: 300 mm/minute
Measurement conditions: temperature 23±2° C., humidity 65±5% RH Subsequently, the pressure-sensitive adhesive surface of the pressure-sensitive adhesive sheet obtained in each of the examples and the comparative examples was bonded to the non-tin surface of an alkali glass plate (manufactured by Matsunami Glass Ind., Ltd.) and then stored under the conditions of 60° C. and 90% RH for 1 week. The pressure-sensitive adhesive sheet was then peeled off at a rate of 0.3 m/minute from the glass plate. Subsequently, an optical transparent pressure-sensitive adhesive sheet (CS9662LS (trade name) manufactured by Nitto Denko Corporation) with a PET backing was attached to the glass surface, which had been exposed after the removal of the pressure-sensitive adhesive sheet, and then pressure-bonded with a 2 kg roller moving back and forth once in an atmosphere at a temperature of 23° C. and a humidity of 50%. Thirty minutes after the pressure bonding, the 180° peel adhesive strength B (N/25 mm) of the pressure-sensitive adhesive sheet was measured with a tension compression tester (AG-IS (product name) manufactured by SHIMADZU CORPORATION) under the following conditions.
Pulling (peel) rate: 300 mm/minute
Measurement conditions: temperature 23±2° C., humidity 65±5% RH The residual adhesive strength (%) was calculated by substituting the resulting adhesive strengths A and B into the formula below and evaluated. The larger residual adhesive strength is an index indicating that the adherend (glass in this case) is less stained.

Residual adhesive strength (%)=100×[(the adhesive strength $B$)/(the adhesive strength $A$)]

In this regard, the residual adhesive strength is preferably 60% or more, more preferably 65% or more, even more preferably 70% or more. The pressure-sensitive adhesive sheet obtained with a residual adhesive strength of 60% or more is less staining (has less-staining properties), can be prevented from leaving stains on adherends, and will not cause any defect in a process after the removal of it, which are advantageous features.

(Wetting Ability)

A 25-mm-wide, 70-mm-long piece was cut from the pressure-sensitive adhesive sheet obtained in each of the examples and the comparative examples. The pressure-sensitive adhesive surface of the cut piece was gently dropped onto the non-tin surface of an alkali glass plate (manufactured by Matsunami Glass Ind., Ltd.), and a video of the spreading pressure-sensitive adhesive surface area was taken for one minute with a camera. The wetting speed ($cm^2$/second) was calculated through the observation and analysis of the video and used for the evaluation of the wetting ability.

The wetting speed on the glass plate (the rate of wetting of the glass surface) is preferably 9 $cm^2$/second or more, more preferably 9.1 $cm^2$/second or more, even more preferably 9.2 $cm^2$/second or more. The pressure-sensitive adhesive sheet obtained with a wetting speed of 9 $cm^2$/second or more has high wetting ability on adherends and therefore is preferred.

(Presence or Absence of Occurrence (Trapping) of Air Bubbles)

During the evaluation of the wetting ability, whether or not wetting occurred without trapping of air bubbles was visually observed for the evaluation of the ability to release air bubbles.
x: Air bubbles are trapped during the evaluation of wetting ability.
◯: No air bubbles are trapped during the evaluation.

(Scratch Resistance)

The adhesive (pressure-sensitive adhesive) surface of the sample (pressure-sensitive adhesive sheet) for evaluation was rubbed with the end of a ballpoint pen with its tip in the unexposed position, and then the presence or absence of scratches (the presence or absence of sticking of the adhesive) was assessed. When there were any scratches (there was any sticking of the adhesive), the scratch resistance was evaluated as poor (X).
x: There are any scratches.
◯: There are no scratches.

(Coating Appearance)

The prepared sample (pressure-sensitive adhesive sheet) for evaluation was aged at 40° C. for 3 days and then visually observed for coating appearance when the appearance properties were evaluated.
x: There is any appearance defect such as occurrence of air bubbles.
◯: There is no appearance defect.

TABLE 2

Pressure-sensitive adhesive layer (pressure-sensitive adhesive sheet)

| | Pressure-sensitive adhesive composition | | | | | | Gel fraction [wt %] | Adhesive strength [N/25 mm] | Residual adhesive strength [%] | Wetting speed [cm²/sec] | Ability to release air bubbles | Scratch resistance | Appearance |
|---|---|---|---|---|---|---|---|---|---|---|---|---|---|
| | Polymer | | Additive | | | Crosslinking | | | | | | | |
| | No. | [wt parts] | Type (molar molecular weight) | [wt parts] | | agent [wt parts] | | | | | | | |
| Example 1 | A | 100 | Methyl linoleate (295) | 50 | | 15 | 60 | 0.03 | 82 | 16.5 | ○ | ○ | ○ |
| Example 2 | B | 100 | Methyl linoleate (295) | 50 | | 15 | 68 | 0.02 | 83 | 17 | ○ | ○ | ○ |
| Example 3 | D | 100 | Methyl linoleate (295) | 50 | | 15 | 68 | 0.02 | 82 | 17.3 | ○ | ○ | ○ |
| Example 4 | E | 100 | Methyl linoleate (295) | 50 | | 15 | 66 | 0.02 | 85 | 17.8 | ○ | ○ | ○ |
| Example 5 | F | 100 | Methyl linoleate (295) | 50 | | 20 | 65 | 0.02 | 85 | 16.9 | ○ | ○ | ○ |
| Example 6 | G | 100 | Methyl linoleate (295) | 50 | | 20 | 64 | 0.01 | 82 | 16.3 | ○ | ○ | ○ |
| Example 7 | H | 100 | Methyl linoleate (295) | 50 | | 15 | 66 | 0.01 | 86 | 18.2 | ○ | ○ | ○ |
| Example 8 | I | 100 | Methyl linoleate (295) | 50 | | 20 | 65 | 0.01 | 85 | 16.3 | ○ | ○ | ○ |
| Example 9 | C | 100 | Isopropyl myristate (270) | 50 | | 15 | 68 | 0.02 | 83 | 15.2 | ○ | ○ | ○ |
| Example 10 | C | 100 | Isopropyl palmitate (299) | 50 | | 15 | 66 | 0.02 | 82 | 17.5 | ○ | ○ | ○ |
| Example 11 | C | 100 | Diisodecyl adipate (427) | 50 | | 15 | 63 | 0.02 | 85 | 9.4 | ○ | ○ | ○ |
| Example 12 | C | 100 | Dioctyl sebacate (427) | 50 | | 15 | 65 | 0.02 | 85 | 13.8 | ○ | ○ | ○ |
| Example 13 | C | 100 | Dioctyl phthalate (390) | 50 | | 15 | 67 | 0.03 | 86 | 10.3 | ○ | ○ | ○ |
| Example 14 | C | 100 | Bis(2-(2-butoxyethoxy) ethyl) adipate (435) | 50 | | 15 | 64 | 0.01 | 83 | 10.8 | ○ | ○ | ○ |
| Example 15 | C | 100 | Methyl linoleate (295) | 10 | | 15 | 88 | 0.03 | 70 | 9.5 | ○ | ○ | ○ |
| Example 16 | C | 100 | Methyl linoleate (295) | 50 | | 15 | 68 | 0.02 | 84 | 17.4 | ○ | ○ | ○ |
| Example 17 | C | 100 | Methyl linoleate (295) | 100 | | 15 | 53 | 0.01 | 86 | 23.5 | ○ | ○ | ○ |
| Example 18 | C | 100 | Methyl linoleate (295) | 150 | | 15 | 41 | 0.01 | 87 | 24.1 | ○ | ○ | ○ |
| Example 19 | C | 100 | Dioctyl adipate (371) | 10 | | 15 | 87 | 0.03 | 76 | 9.3 | ○ | ○ | ○ |
| Example 20 | C | 100 | Dioctyl adipate (371) | 50 | | 15 | 66 | 0.02 | 85 | 10.5 | ○ | ○ | ○ |
| Example 21 | C | 100 | Dioctyl adipate (371) | 100 | | 15 | 50 | 0.01 | 88 | 20.1 | ○ | ○ | ○ |
| Example 22 | C | 100 | Dioctyl adipate (371) | 150 | | 15 | 40 | 0.01 | 89 | 23 | ○ | ○ | ○ |

TABLE 3

Pressure-sensitive adhesive layer (pressure-sensitive adhesive sheet)

| | Pressure-sensitive adhesive composition | | | | | | Gel fraction [wt %] | Adhesive strength [N/25 mm] | Residual adhesive strength [%] | Wetting speed [cm²/sec] | Ability to release air bubbles | Scratch resistance | Appearance |
|---|---|---|---|---|---|---|---|---|---|---|---|---|---|
| | Polymer | | Additive | | | Crosslinking | | | | | | | |
| | No. | [wt parts] | Type (molar molecular weight) | [wt parts] | | agent [wt parts] | | | | | | | |
| Comparative Example 1 | C | 100 | Hydrocarbon oil (300) | 50 | | 15 | 63 | Unmeasurable | Unmeasurable | — | — | — | ○ |
| Comparative Example 2 | C | 100 | Methyl linoleate (295) | 5 | | 15 | 91 | 0.04 | 68 | 8.8 | ○ | ○ | ○ |
| Comparative Example 3 | C | 100 | Methyl linoleate (295) | 200 | | 15 | 35 | 0.01 | 90 | 25 | ○ | x | ○ |
| Comparative Example 4 | C | 100 | — | 0 | | 15 | 92 | 0.04 | 74 | 8.5 | ○ | ○ | ○ |
| Comparative Example 5 | Acryl-based polymer | 100 | Methyl linoleate (295) | 50 | | 4 | 66 | 0.04 | 77 | 8.5 | x | ○ | ○ |
| Comparative Example 6 | Silicone-based pressure-sensitive adhesive | | | | | — | — | 0.02 | 45 | 16 | ○ | ○ | ○ |
| Comparative Example 7 | J | 100 | Methyl linoleate (295) | 50 | | 10 | 53 | 0.03 | 80 | 9.3 | x | ○ | ○ |
| Comparative Example 8 | K | 100 | Methyl linoleate (295) | 50 | | 20 | 63 | 0.02 | 84 | 9.2 | x | ○ | x |
| Comparative Example 9 | C | 100 | Methyl enanthate (158) | 50 | | 15 | 95 | 0.04 | 75 | 8.7 | ○ | ○ | ○ |
| Comparative Example 10 | C | 100 | Adipic acid-based polyester (800) | 50 | | 15 | 65 | Unmeasurable | Unmeasurable | — | — | — | ○ |
| Comparative Example 11 | C | 100 | Glyceryl stearate (359) | 50 | | 15 | 85 | 0.09 | 72 | 72 | ○ | ○ | ○ |

Note: In Table 3, the mark "—" in the cells for the results of evaluation of the pressure-sensitive adhesive layer (pressure-sensitive adhesive sheet) indicates that the evaluation itself was impossible.

The results in Table 2 show that pressure-sensitive adhesive sheets having high wetting ability and superior adherability, light peelability, scratch resistance, and appearance properties were successfully obtained in the examples.

In contrast, the results in Table 3 show the following. In Comparative Example 1, where an additive (hydrocarbon oil) other than the fatty acid ester as an essential component was used, staining occurred so that the adhesive strength and other properties were not able to be evaluated. In Comparative Example 2, where the fatty acid ester was added in a relatively small amount, the resulting wetting ability was relatively low. In Comparative Example 3, where the fatty acid ester was added in a relatively large amount, the pressure-sensitive adhesive layer was easily scratched by a small impact (rubbing with the end of a ballpoint pen) and had poor scratch resistance. This would be because the pressure-sensitive adhesive layer was swelling considerably (the polymer chain was fully stretched). In Comparative Example 4, where no fatty acid ester was added, the wetting ability was poor. In Comparative Example 5, where an acryl-based polymer was used instead of the polyester, the resulting wetting ability was lower than that when the polyester was used.

The results in Table 3 also show the following. In Comparative Example 6, where a silicone-based pressure-sensitive adhesive was used, the residual adhesive strength decreased due to the staining caused by silicone. In Comparative Examples 7 and 8, where the weight average molecular weight of the polyester was out of the desired range, air bubbles were difficult to release. In Comparative Example 8, an appearance defect further occurred. In Comparative Example 9, where the fatty acid ester used had a relatively low molecular weight, the wetting ability was not effectively improved. In Comparative Example 10, where the fatty acid ester used had a relatively high molecular weight, staining occurred, so that the adhesive strength and other properties were not able to be evaluated. In Comparative Example 11, where the fatty acid ester used had an additional functional group, the resulting wetting ability was poor.

The invention claimed is:

1. A polyester-based pressure-sensitive adhesive sheet, comprising:
   a support; and
   a pressure-sensitive adhesive layer formed on at least one side of the support through crosslinking of a polyester-based pressure-sensitive adhesive composition,
   wherein said a polyester-based pressure-sensitive adhesive composition comprises:
   a polyester obtained by polycondensation of a difunctional or polyfunctional carboxylic acid and a diol;
   a fatty acid ester; and
   a crosslinking agent, wherein
   the fatty acid ester does not react with the crosslinking agent,
   the polyester has a weight average molecular weight of 9,000 to 42,000,
   the fatty acid ester has a molecular weight of 200 to 700,
   the polyester-based pressure-sensitive adhesive composition containing 10 to 150 parts by weight of the fatty acid ester based on 100 parts by weight of the polyester, and
   the pressure-sensitive adhesive layer has a gel fraction of 40 to 80% by weight,
   wherein the polyester-based pressure-sensitive adhesive sheet has an adhesive strength of 0.08 N/25 mm or less to a glass surface,
   wherein the polyester contains less than 3% by weight of a monocarboxylic acid component,
   wherein molar ratio (OH/COOH) of hydroxyl groups of the diol to carboxyl groups of the carboxylic acid is from 1.28 to 3, and
   wherein the crosslinking agent is present in an amount of 15 to 30 parts by weight per 100 parts by weight of the polyester.

2. The pressure-sensitive adhesive sheet according to claim 1, which has a wetting speed of 9 $cm^2$/second or more on a glass surface.

3. The polyester-based pressure-sensitive adhesive sheet according to claim 1, wherein the crosslinking agent is an isocyanate crosslinking agent.

4. The pressure-sensitive adhesive sheet according to claim 3, which has a wetting speed of 9 $cm^2$/second or more on a glass surface.

* * * * *